(12) United States Patent
Chen

(10) Patent No.: US 8,279,395 B2
(45) Date of Patent: Oct. 2, 2012

(54) SYSTEM AND EYEWEAR FOR VIEWING STEREOSCOPIC IMAGERY

(75) Inventor: Jianmin Chen, Superior, CO (US)

(73) Assignee: RealD Inc., Beverly Hills, CA (US)

( * ) Notice: Subject to any disclaimer, the term of this patent is extended or adjusted under 35 U.S.C. 154(b) by 676 days.

(21) Appl. No.: 12/206,115

(22) Filed: Sep. 8, 2008

(65) Prior Publication Data

US 2009/0066863 A1 Mar. 12, 2009

Related U.S. Application Data

(60) Provisional application No. 60/970,934, filed on Sep. 7, 2007, provisional application No. 61/046,209, filed on Apr. 18, 2008.

(51) Int. Cl.
*C09K 19/02* (2006.01)
*G02F 1/1335* (2006.01)
*G02F 1/13* (2006.01)

(52) U.S. Cl. .......... 349/180; 349/76; 349/101; 349/186; 349/96; 349/200; 349/13

(58) Field of Classification Search ............ 349/76, 349/101, 177, 179, 180, 186
See application file for complete search history.

(56) References Cited

U.S. PATENT DOCUMENTS

| | | | |
|---|---|---|---|
| 4,143,947 A | 3/1979 | Aftergut et al. | |
| 4,385,806 A | 5/1983 | Fergason | |
| 4,884,876 A | 12/1989 | Lipton et al. | |
| 5,117,302 A | 5/1992 | Lipton | |
| 5,327,269 A | 7/1994 | Tilton et al. | |
| 5,557,434 A | 9/1996 | Winker et al. | |
| 6,201,259 B1* | 3/2001 | Sato et al. | 257/30 |
| 6,359,671 B1* | 3/2002 | Abileah | 349/119 |
| 6,932,090 B1 | 8/2005 | Reschke et al. | |
| 2003/0089956 A1 | 5/2003 | Allen et al. | |
| 2003/0232927 A1 | 12/2003 | Gibbons et al. | |
| 2005/0083396 A1* | 4/2005 | Shiota et al. | 347/239 |
| 2005/0196550 A1 | 9/2005 | Lazarev et al. | |
| 2005/0270458 A1 | 12/2005 | Ishikawa et al. | |

FOREIGN PATENT DOCUMENTS

| | | |
|---|---|---|
| JP | 2000023 A | 1/1990 |
| WO | 2004102265 A1 | 11/2004 |
| WO | WO2006122899 A1 | 11/2006 |

OTHER PUBLICATIONS

International search report and written opinion of international searching authority for co-pending PCT/US2008/075554 dated Nov. 19, 2008.

(Continued)

*Primary Examiner* — Mark Robinson
*Assistant Examiner* — Mary El Shammaa
(74) *Attorney, Agent, or Firm* — Baker & McKenzie LLP

(57) ABSTRACT

A super-twist nematic (STN) liquid crystal (LC) light shutter with improved contrast performance, lower power requirements and enhanced off-axis performance. Compensator components may be disposed in front of and, in some cases, behind the liquid crystal cell. In some embodiments, a STN LC cell with a twist angle of 270 degrees may be used. In other embodiments, a STN LC cell with a twist angle ranging between just greater than 270 degrees and 285 degrees may be used. Also disclosed is a system incorporating the various disclosed STN LC shutters.

9 Claims, 16 Drawing Sheets

OTHER PUBLICATIONS

International search report and written opinion of international searching authority for co-pending PCT application number PCT/US2007/019466 mailed Oct. 16, 2008.

Supplementary European search report from co-pending European application No. EP 08829928 dated Dec. 17, 2010.

International preliminary report on patentability in co-pending PCT application No. PCT/US2008/075554.

International search report and written opinion of international search authority in co-pending PCT application No. PCT/US08/75554 mailed Nov. 19, 2008.

Office action from Chinese patent application No. 200880105997.X dated Feb. 23, 2012.

* cited by examiner

SYSTEM AND EYEWEAR FOR VIEWING STEREOSCOPIC IMAGERY

CROSS-REFERENCE TO RELATED APPLICATIONS

This patent application relates and claims priority to provisional patent application 60/970,934, entitled "High performance liquid crystal lens for eyewear applications," filed Sep. 7, 2007; and this patent application also relates and claims priority to provisional patent application 61/046,209, entitled "Wide field of view biaxial film compensated super-twist nematic shutter, filed Apr. 18, 2008, both of which are herein incorporated by reference for all purposes. This application was filed on the first working day following Sunday, Sep. 7, 2008, thus making this application timely filed pursuant to MPEP §2133.

BACKGROUND

1. Technical Field

This disclosure relates to achromatic electro-optical shutters, and more specifically, to achromatic electro-optical shutters using super-twist nematic (STN) liquid crystal (LC) cells.

2. Background

A plano-stereoscopic display is one which produces the depth sense, stereopsis, by presenting appropriate left and right planar images to each respective eye. For the observer to be able to fuse these two planar images into a single stereoscopic view, the image for one eye must be isolated from the other. If the left eye, for example, also sees all or a portion of the intensity of the right image, there will be a perceived doubling of the image or "ghosting." Incomplete left and right channel isolation, or crosstalk, is of great concern to the designer of a stereoscopic system. Such crosstalk may be caused by poor contrast performance of a liquid crystal (LC) shutter.

LC shutters have been used for 3D applications for many years. Usually, bend mode LC shutters, called PI cells are used for such applications. Even though a suitably designed PI cell LC shutter provides a relatively fast response time, it typically requires a sophisticated drive waveform to convert splayed LC mode to bend mode for it to function adequately. Furthermore, PI cell LC shutters have an undesirable spotty appearance for several minutes after power-down, during the gradual transition back to splay state. As an alternative, Super-twist nematic (STN) liquid crystal (LC) cells may be used. Conventional STN LC shutter solutions are advantageous in that they do not require an initial waveform and they have a uniform neutral appearance after power-down. However, the disadvantages of conventional STN LC-based shutters are that they typically use a high voltage to provide a high-density off-state, have a narrow field of view (FoV), and a relatively slow response time.

SUMMARY

Using the techniques of the present disclosure, several compensated STN configurations for high contrast light shutters are provided. They demonstrate a wide field of view, lower power consumption, and are suitable for high quality 3D and dual-view applications.

According to an aspect, a liquid crystal shutter lens includes a first and second polarizer, a STN LC cell, and a first biaxial compensator. The first polarizer has an absorption axis oriented in a first direction, the second polarizer has an absorption axis oriented in a second direction and substantially orthogonal to the first direction. The STN LC cell is positioned between the first polarizer and the second polarizer, wherein the STN LC cell has a first buffing direction orientated in substantially the same direction as the first direction, and wherein the STN LC cell has a second buffing direction substantially 270 degrees from the first direction. The first biaxial compensator element is located between the first polarizer and the second polarizer. Some embodiments may include a second biaxial compensator element between the second polarizer and the STN LC, wherein the first biaxial compensator element is between the first polarizer and the STN LC.

According to another aspect, eyewear for viewing stereoscopic content includes first and second shutter lenses. Each shutter lens includes a first and second polarizer, a STN LC cell, with a first biaxial compensator between the first polarizer and the STN LC cell, and with a second biaxial compensator between the second polarizer and the STN LC cell. The first and second polarizers have absorption axes that are arranged orthogonally to each other. In some embodiments, one or more of the biaxial compensators may be oriented either parallel or at a slight angle relative to the absorption axis of the respective adjacent polarizer. In some embodiments, the STN LC cell has a twist angle of substantially 270 degrees. In other embodiments, the STN LC cell may have a twist angle in the range just greater than 270 degrees to 285 degrees.

According to another aspect, a stereoscopic viewing system provides eyewear that includes left and right eye shutters and a receiver. The left and right eye shutters each include a super-twisted nematic (STN) liquid crystal (LC) cell and at least one compensator element between first and second orthogonal polarizers. The receiver is operable to receive synchronization information to alternately operate the left and right eye shutters between a light-transmitting state and a light-blocking state, with the receiver being coupled to the left and right eye shutters. The stereoscopic viewing system may further include a transmitter operable to transmit the synchronization information.

According to yet another aspect, a liquid crystal shutter lens may include a STN LC cell with a twist angle in a range between just greater than 270 degrees and 285 degrees, located between first and second orthogonal polarizers. Consistent with this aspect, in some embodiments a compensator element may be located between a polarizer and the STN LC cell.

Other features will be apparent with reference to the foregoing specification.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
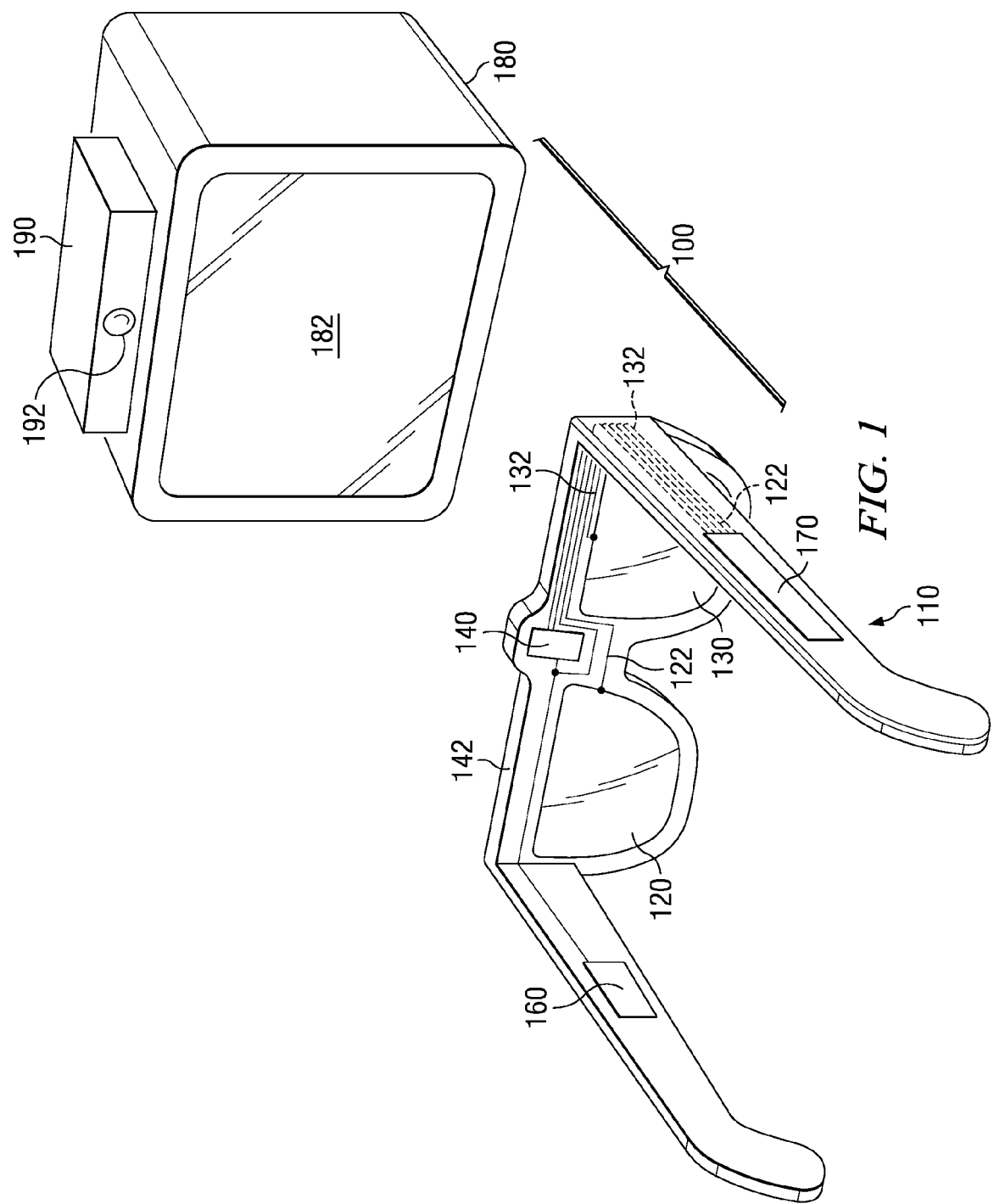
FIG. 1 is a schematic diagram of a system 100 for viewing stereoscopic imagery, in accordance with the present disclosure.

FIG. 1 is a schematic diagram of a system 100 for viewing stereoscopic imagery. The system 100 employs a controller 190 that includes infrared (IR) transmitter 192. The transmitter 192 broadcasts synchronization information to eyewear 110 having achromatic shutter components 120 and 130 as lenses. It is possible to synchronize the occlusion of the eyewear's active electro-optical elements with the field-rate of the image displayed by electronic display unit 180, where the controller 190 and display unit 180 receive the same synchronization information from a common source (not shown). An infrared transmitter 192 is a preferred transmitter to use for this purpose, but another wireless means, such as radio (e.g., Bluetooth) or ultrasound, may alternatively be employed. Use of an infrared transmitter or low power radio technology is desirable for the wireless link because of the proliferation of such technology in the field of home electronics which has resulted in its relative perfection as a form of wireless signaling. An alternate embodiment may use a wired link for signaling between controller 190 and spectacles 110.

The selection device for the stereoscopic electronic display system 100 is eyewear 110 including achromatic shutter components 120 and 130. The achromatic shutter components 120 and 130 are preferably driven by a carrier-less voltage signal. Each of identical achromatic shutter elements 120 and 130 is preferably a portion of the exemplary shutters shown in FIGS. 2A, 2E, 3A, 4A, 5, 6, 7, 8, 9A, 10A, 10B, 13A, 13B, or a variation thereof. For the sake of simplicity, and because the argument is obviously extendable with clear-cut analogy, we will describe FIG. 1 as if each of shutter elements 120 and 130 is a portion of the shutter 700 of FIG. 7.

The exemplary system 100 includes an IR link, including IR transmitter 190 at display unit 180, and IR receiver 140 in the frame of spectacles 110. Receiver 140 receives IR sync information broadcast by transmitter 192 and uses this sync information to synchronize the drive signals supplied via electric lines 122 and 132 to achromatic shutter elements 120 and 130 so that elements 120 and 130 switch in synchronization with the video display field-rate.

Power supply and drive circuit for shutter elements 120 and 130 and IR receiver 140 may be incorporated in small battery pack 160 and drive circuit module 170 incorporated within the frames of spectacles 110 themselves, or in a small pack (not shown) the size of a credit card mounted adjacent the spectacles 110, such as in a shirt pocket of the viewer. Such a reduction of power is of importance, since it is important to be able to use small, light-weight batteries and to be able to run the spectacles for a long period of time without replacement of batteries or recharging of batteries.

The drive signals supplied to shutters 120 and 130 are generated in drive circuit module 170 incorporated in the frame of spectacles 110, and connected via wires 122 and 132 to shutter elements 120 and 130, respectively, and via wire 142 to receiver 140.

Figure 2A:
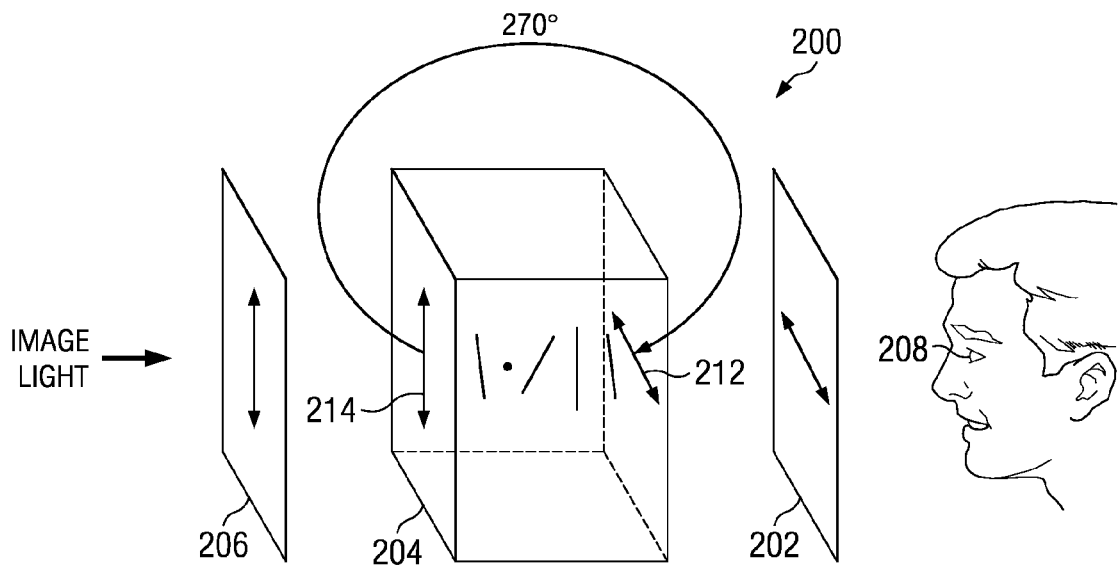
FIG. 2A is a schematic diagram of a conventional e-mode 270° STN liquid crystal shutter.

FIG. 2A is a schematic diagram of a conventional STN liquid crystal shutter 200. The conventional 270° STN may be operated in either e-mode or o-mode, as determined by the orientation of the polarizer relative to the rubbing direction. For e-mode operation, the transmission axis of the first polarizer is aligned with the adjacent cell substrate buffing direction, while in the o-mode, the transmission axis of the first polarizer is aligned perpendicular to the adjacent cell substrate buffing direction.

E-mode Shutter 200 includes first polarizer 202, second polarizer 206, and a super-twisted nematic (STN) liquid crystal (LC) cell 204 positioned between the first polarizer 202 and the second polarizer 206. The absorption axis of first polarizer 202 is arranged orthogonal to the absorption axis of second polarizer 206. In the conventional shutter 200, the absorption axis of first polarizer 202 is parallel to front buffing direction 212, while the absorption axis of second polarizer 206 is parallel to rear buffing direction 214.

Figure 2B:
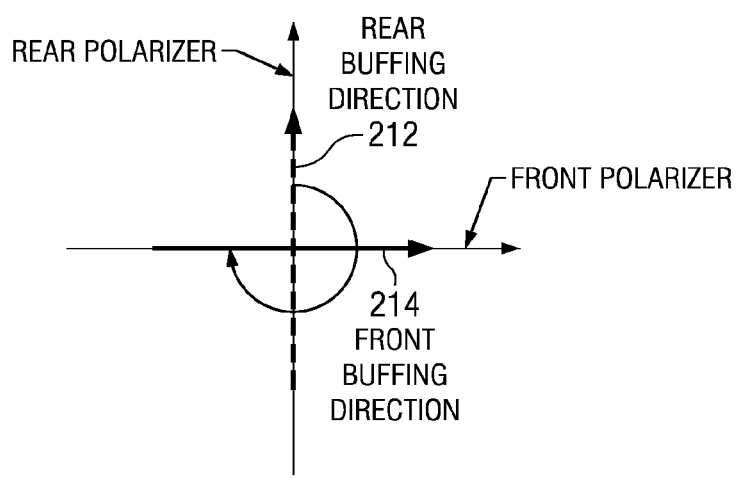
FIG. 2B is a schematic diagram showing the orientation of the liquid crystal molecules relative to the front and rear polarizers in the conventional e-mode 270° STN shutter of FIG. 2A.

FIG. 2B is a schematic diagram showing the orientation of the liquid crystal molecules relative to the front and rear polarizers 202, 206. When an appropriate magnitude of voltage is applied to STN LC cell 204, the liquid crystal molecules are twisted 270 degrees from front buffing direction 212 to rear buffing direction 214.

Figure 2C:
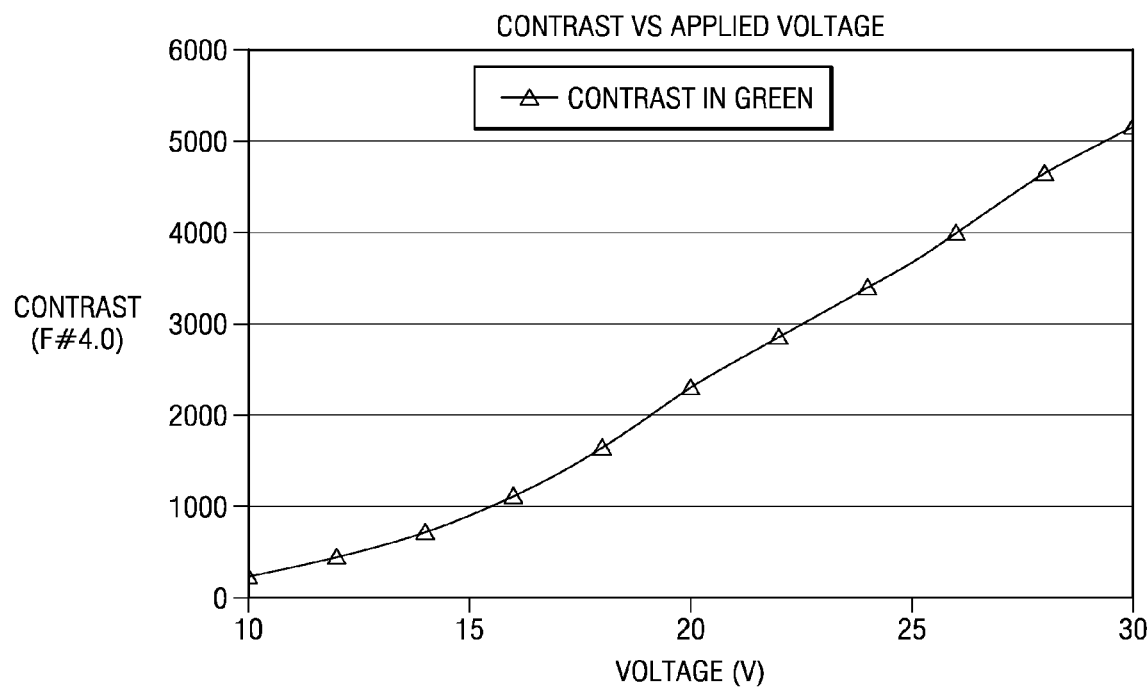
FIG. 2C is a graph diagram showing measured contrast against applied voltage for the conventional e-mode 270° STN shutter of FIG. 2A.

FIG. 2C is a graph diagram showing measured contrast against applied voltage for conventional shutter 200. The shutter 200's typical contrast versus voltage monotonically increases with applied voltage. As seen, shutter 200 requires high voltage for high contrast. The contrast is largely determined by the off-state, which (for typical normally-white operation) is given when the cell is driven to a high-voltage state. The power consumption is proportional to the square of voltage. Life time of battery is a factor considered for such applications, and such a power requirement for high contrast performance is demanding of the battery technology.

Figure 2D:
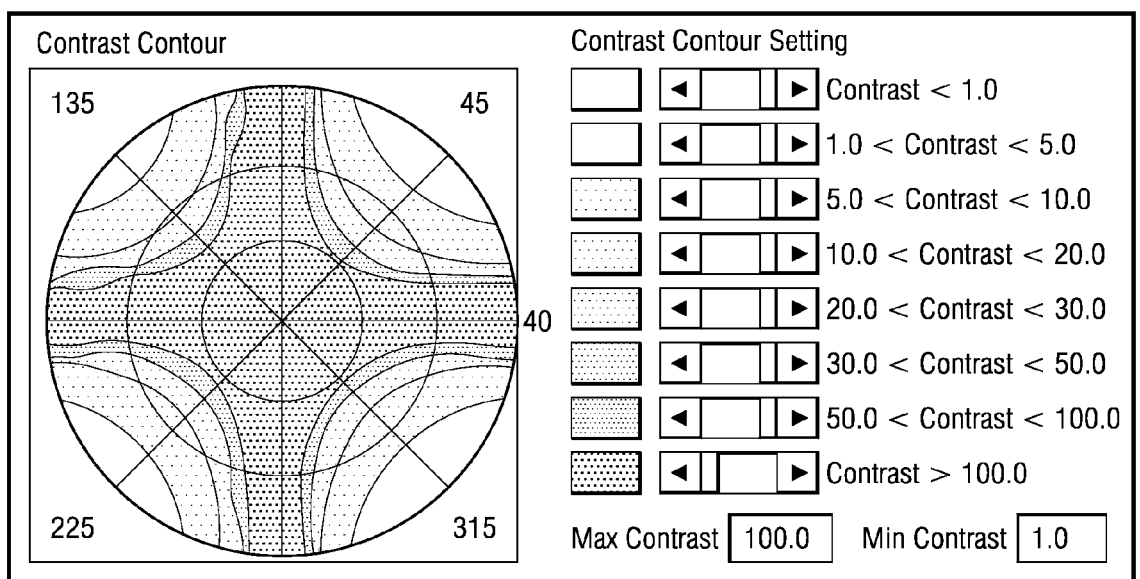
FIG. 2D is a polar graph showing a field of view plot for the conventional shutter of FIG. 2A.

FIG. 2D is a polar graph 230 showing a field of view (FoV) plot for conventional shutter 200. The polar graph 230 shows the ratio of on-state transmission to off-state (energized) transmission. Each point corresponds to a specific incidence angle (displacement from origin) and azimuth angle (measured counter-clockwise from horizontal). Contours of fixed color/gray level correspond to a specific range of contrast, which are plotted on a quasi-log scale. In this case, V(black state)=25V and V(bright state)=0V. The polar plot for o-mode operation is substantially similar to the polar graph 230. As seen, the FoV where the contrast ratio exceeds 100:1 is very narrow.

Without any compensation, polar graph 230 shows that there is considerable light leakage, thereby significantly narrowing the FoV in the ±45° azimuth. This is due to the large z-retardation associated with the LC when energized with a large voltage (Δnd~800 nm). In order to remove the large positive a-plate effect associate with the LC, a compensation film may be used.

Figure 2E:
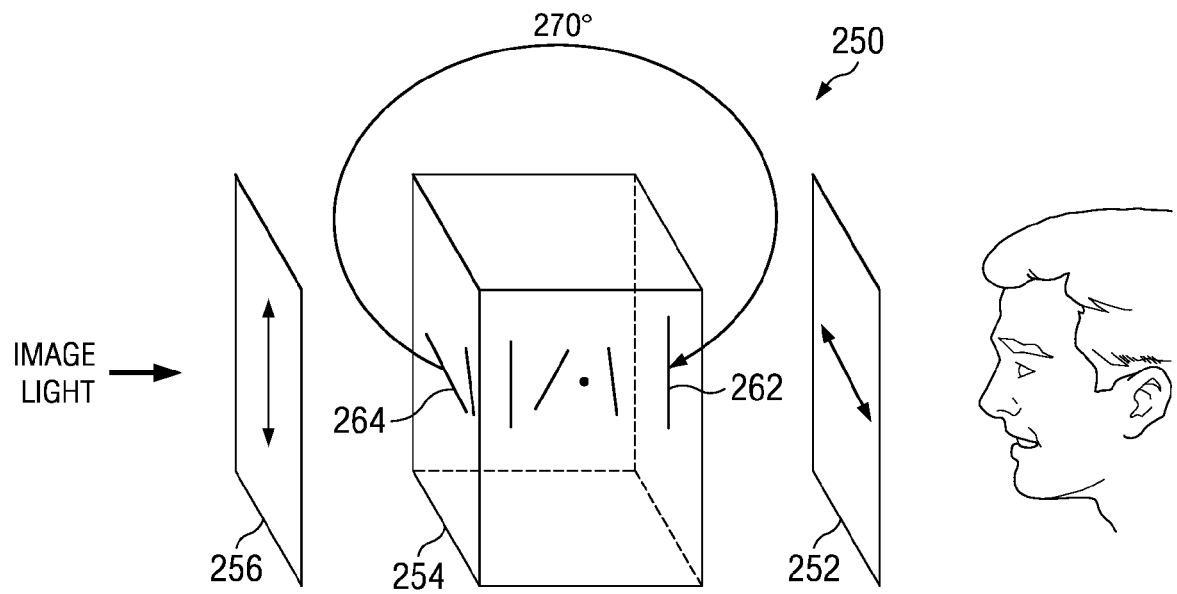
FIG. 2E is a schematic diagram of a conventional o-mode 270° STN liquid crystal shutter.

FIG. 2E is a schematic diagram of a conventional o-mode 270° STN liquid crystal shutter 250. O-mode Shutter 250 includes first polarizer 252, second polarizer 256, and a super-twisted nematic (STN) liquid crystal (LC) cell 254 positioned between the first polarizer 252 and the second polarizer 256. In the o-mode, the transmission axis of the first polarizer 252 is aligned perpendicular to the adjacent cell substrate buffing direction.

Figure 2F:
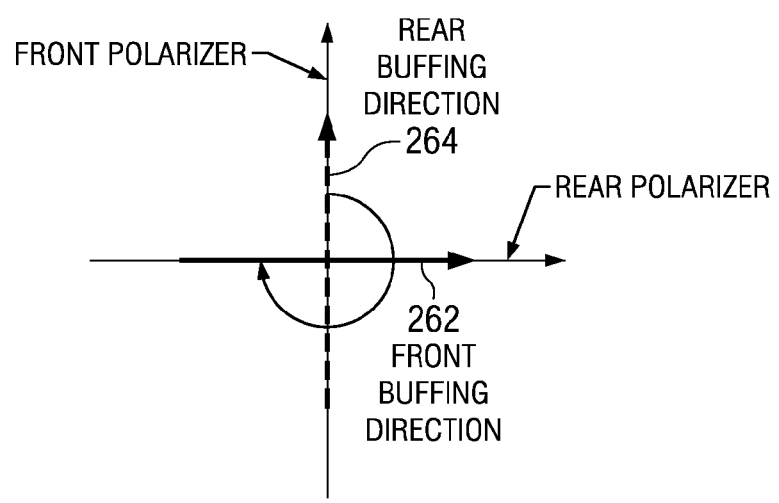

FIG. 2F is a schematic diagram showing the orientation of the liquid crystal molecules relative to the front and rear polarizers 252, 256. When an appropriate magnitude of voltage is applied to STN LC cell 254, the liquid crystal molecules are twisted 270 degrees from front buffing direction 262 to rear buffing direction 264.

Given that low voltage and high contrast configurations are desirable for stereoscopic eyewear or shutterglasses, various embodiments are presented below that address these issues.

Figure 3A:
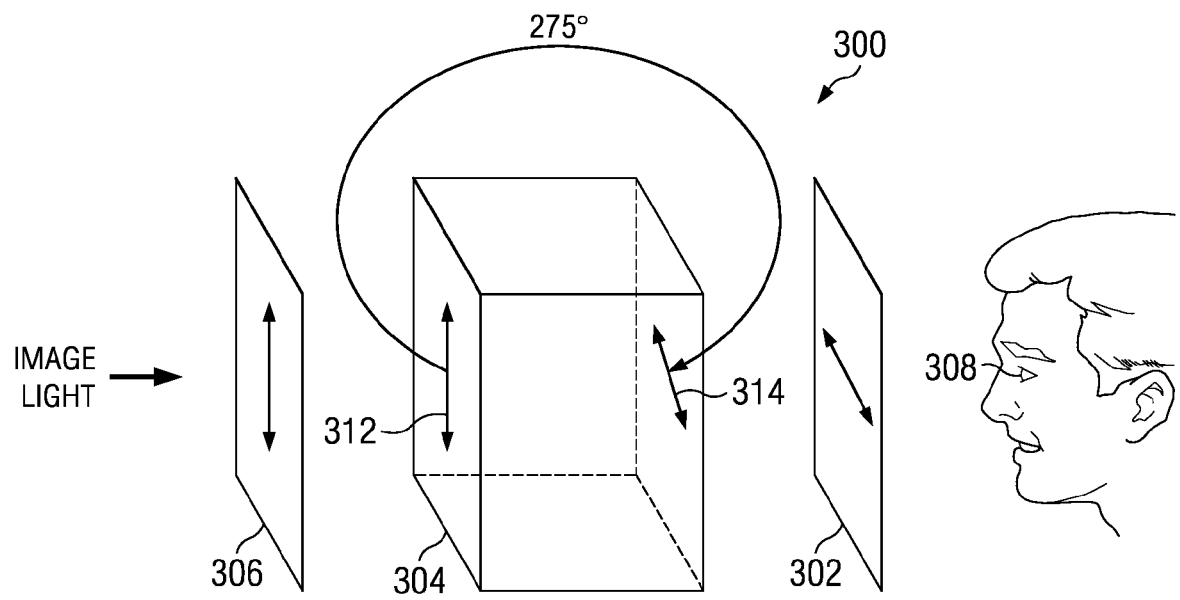
FIG. 3A is a schematic diagram of a STN liquid crystal shutter with an STN LC cell having a greater-than 270 degree twist angle, in accordance with the present disclosure.

FIG. 3A is a schematic diagram of a STN liquid crystal shutter 300 with an STN LC cell having a greater-than 270 degree twist angle. Shutter 300 includes first polarizer 302, second polarizer 306, and a super-twisted nematic (STN) liquid crystal (LC) cell 304 positioned between the first polarizer 302 and the second polarizer 306. The absorption axis of first polarizer 302 is arranged orthogonal to the absorption axis of second polarizer 306.

Figure 3B:
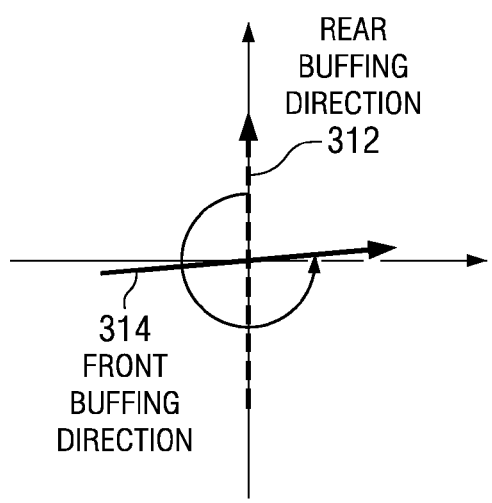
FIG. 3B is a schematic diagram showing the orientation of the liquid crystal molecules in the STN LC cell of FIG. 3A relative to the front and rear polarizers.

As illustrated by FIG. 3B, front buffing direction 312 may be at an angle between greater than 270 degrees and 285 degrees to the absorption axis of first polarizer 302. The absorption axis of second polarizer 306 is parallel to rear buffing direction 314. In an illustrated embodiment, the twist angle is 275° and in another illustrated embodiment, the twist angle is 280°. As used herein, "buffing" refers to giving the inner surfaces of the STN LC cell a texture so as to align the liquid crystal molecules in a certain direction parallel to the surfaces. Front buffing direction refers to the textured direction of the front surface of the STN LC cell, and rear buffing direction refers to the textured direction of the rear surface.

Figure 3C:
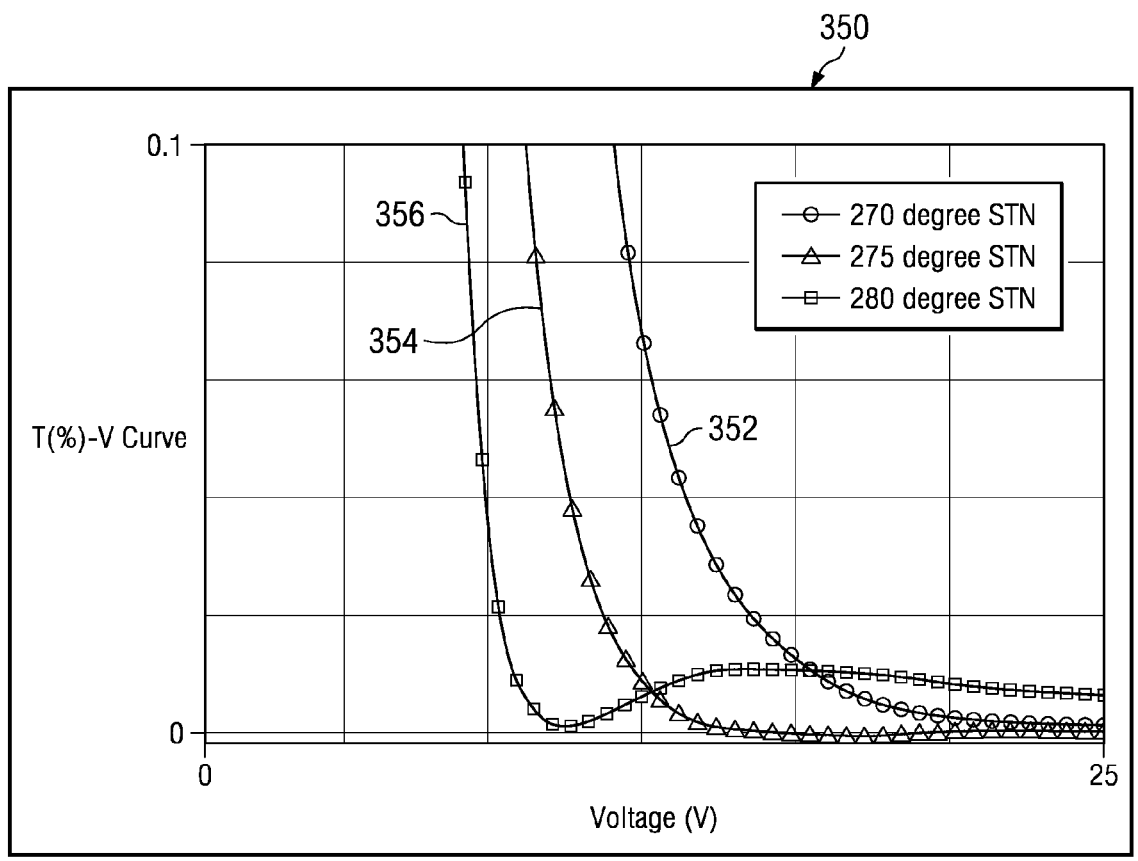
FIG. 3C is a graph showing transmission against voltage applied to various STN LC cells illustrating that an optimum contrast voltage may be tuned through adjusting the twist angle of the STN LC.

FIG. 3C is a graph 350 showing transmission against voltage applied to various STN LC cells illustrating that an optimum contrast voltage may be tuned through adjusting the twist angle of STN LC. Line 352 is a plot illustrating the transmission/voltage (T-V) performance of conventional shutter 200 (a 270° STN LC). Line 254 shows the T-V performance for STN LC 304, where the twist angle is set at 275 degrees. Line 356 illustrates an alternative embodiment, where the twist angle is set at 280 degrees. As seen from graph 350, line 352 shows that a higher voltage is required to provide good contrast performance for the conventional shutter 200 compared with other shutters having a twist angle greater than 270 degrees (e.g., lines 354 and 356).

Figure 4A:
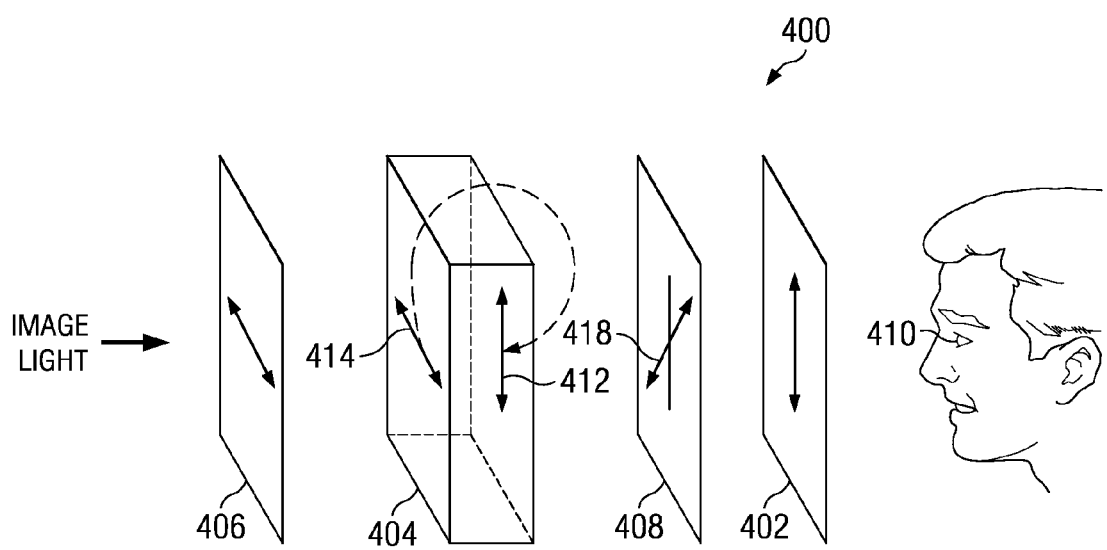
FIG. 4A is a schematic diagram of a STN liquid crystal shutter with a compensator element to provide enhanced contrast performance, in accordance with the present disclosure.

FIG. 4A is a schematic diagram of a STN liquid crystal shutter 400 with a compensator element to provide enhanced contrast performance. Shutter 400 includes first polarizer 402, second polarizer 406, a super-twisted nematic (STN) liquid crystal (LC) cell 404 positioned between the first polarizer 402 and the second polarizer 406, and a compensator element 408. The absorption axis of first polarizer 402 is arranged orthogonal to the absorption axis of second polarizer 406. Compensator element 408 may be located between first polarizer 402 and STN LC cell 404.

Figure 4B:
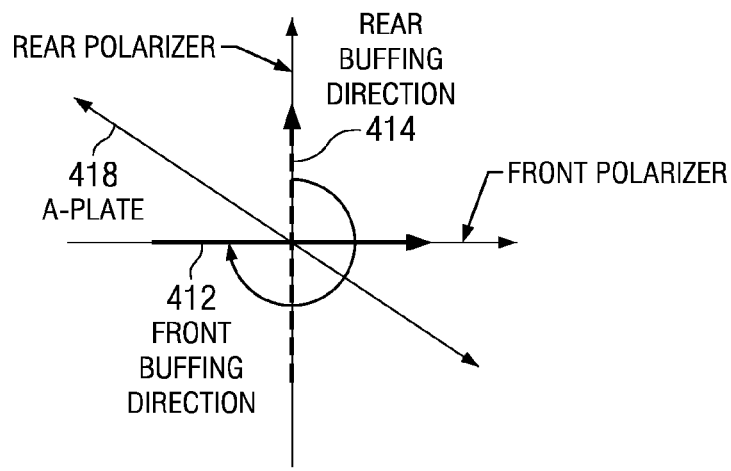
FIG. 4B is a schematic diagram showing the orientation of the liquid crystal molecules in the STN LC cell of FIG. 4A relative to the front and rear polarizers.
Figure 4C:
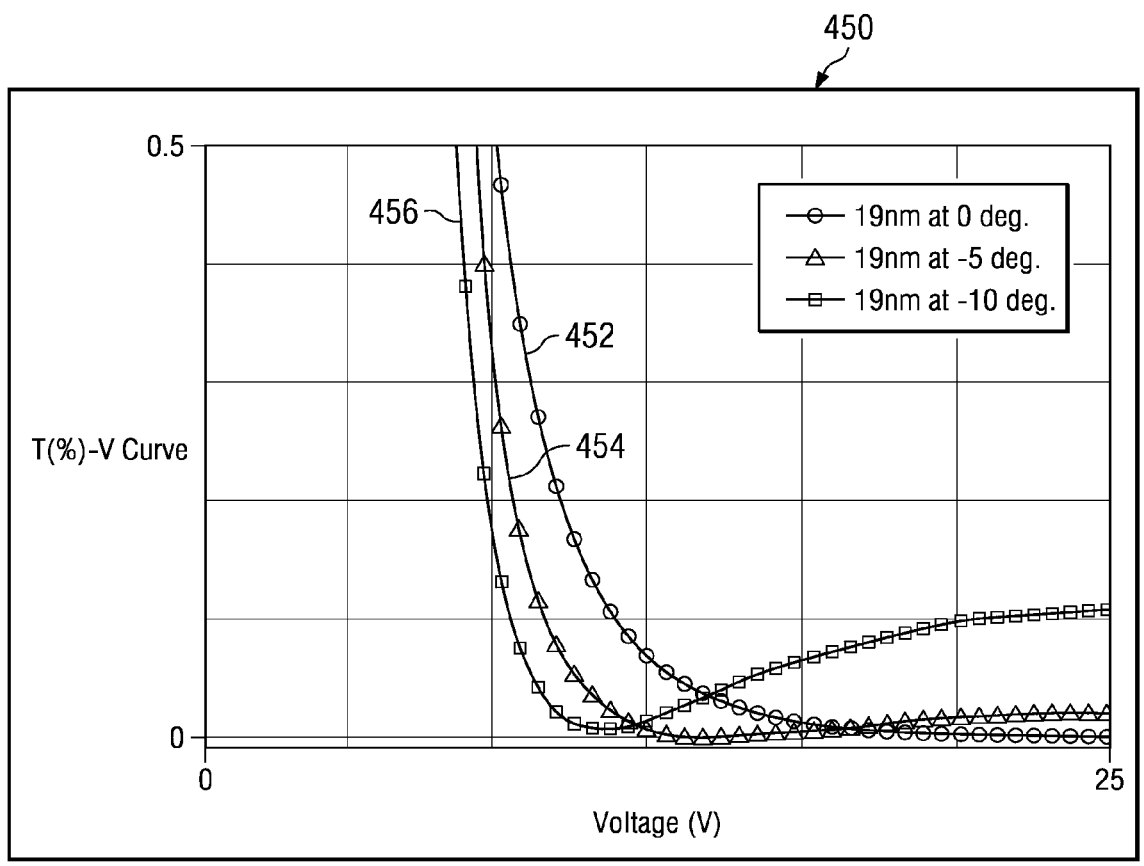
FIG. 4C is a graph diagram of transmission against voltage, showing optimum contrast voltage for various angles of orientation for the compensator element described in FIG. 4A.

FIG. 4B is a schematic diagram showing the orientation of the liquid crystal molecules relative to the front and rear polarizers 402, 406. When an appropriate magnitude of voltage is applied to STN LC cell 404, the liquid crystal molecules are twisted 270 degrees from front buffing direction 412 to rear buffing direction 414. In an exemplary embodiment, compensator element 408 is an A-plate (retarder). Background information on A-plate retarders may be found in [Polarization Engineering Book], herein incorporated by reference. The optimum contrast voltage will be altered depending on the magnitude and orientation of the A-plate. The retardation of the A-plate may be between 5 and 100 nm. In an embodiment, a 270° STN cell and 19 nm A-plate (nx>ny=nz, (nx−ny)d=19 nm) are used. As may be seen from FIG. 4C, which provides a graph diagram 450 of transmission against voltage, the optimum contrast voltage shifts lower as the 19 nm A-plate's angle of orientation is rotated in a range from zero to ten degrees relative to the front buffing direction 412. The small angle rotation (e.g., 3 to 5 degrees) of the A-plate is preferred due to the high tolerance on voltage because it results in a flatter curve, shown by line 454. FIG. 4C also demonstrates that the contrast peak shifts from 30V to 15V as the 19 nm a-plate is rotated by 5 degrees, as shown by the zero degree line 452 and the five degree line 454.

In another embodiment, the compensator element 408 may be located between STN LC cell 404 and second polarizer 406; in which case, the A-plate's angle of orientation will be between zero and ten degrees from the rear buffing direction 414.

Figure 4D:
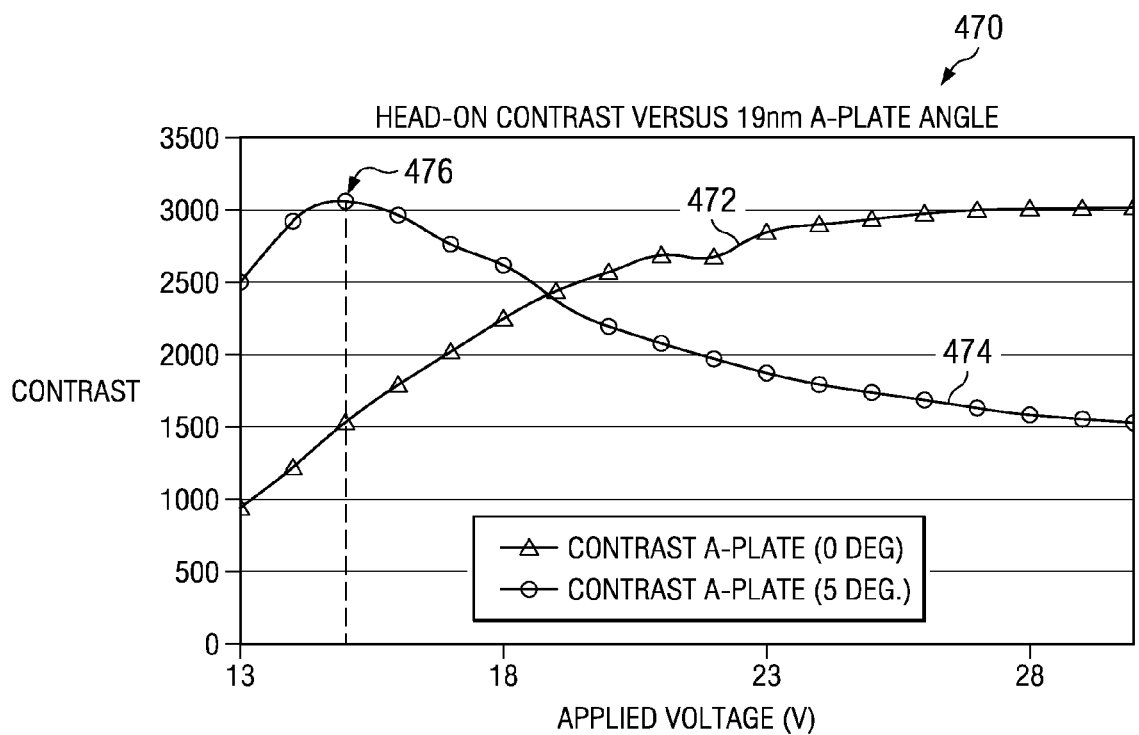
FIG. 4D is a graph diagram showing measured contrast against applied voltage for the shutter described in FIG. 4A.

FIG. 4D is a graph diagram 470 showing measured contrast against applied voltage for shutter 400. Line 472 shows the shutter 400's contrast versus voltage performance when the A-plate is oriented in line with the front buffing direction, where generally, contrast increases with applied voltage. For the scenario where the A-plate is oriented at a five degree angle, line 474 shows that there is an optimum contrast achieved for an applied voltage around 15V (at point 476). Given the desire to provide enhanced contrast performance at lower voltages, it is therefore advantageous to rotate the A-plate compensator element 408 by five degrees. Other compensator elements 408 may be used. For instance a 400 nm negative c-plate may provide advantageous contrast performance.

Figure 4E:
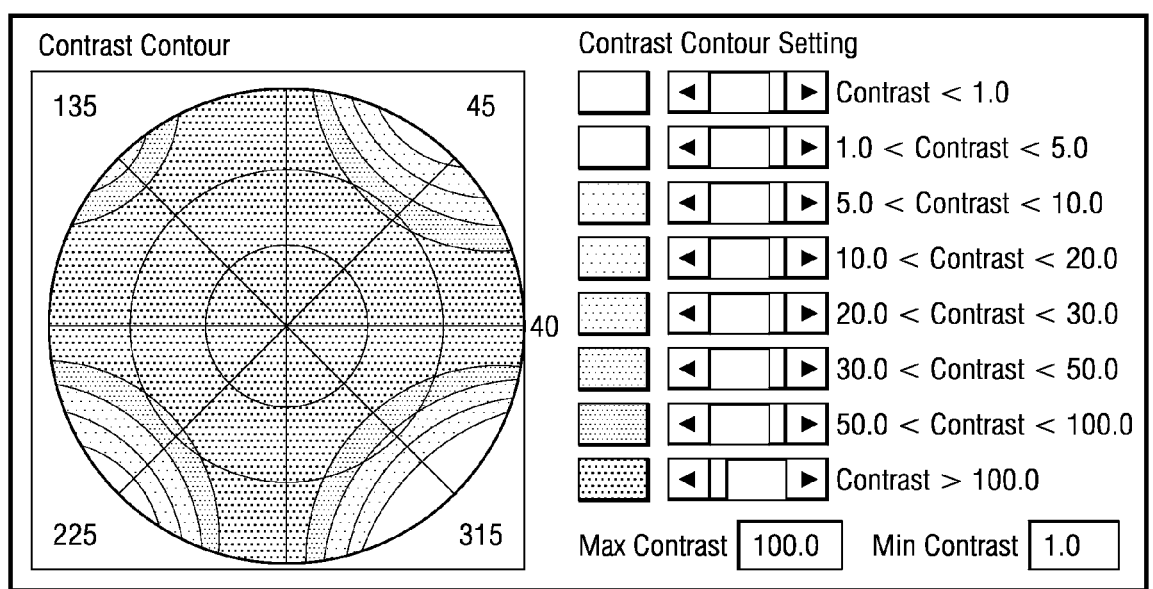
FIG. 4E is a polar graph showing a field of view plot for the shutter of FIG. 4A using a 400 nm negative c-plate as a compensator element, in accordance with the present disclosure.

FIG. 4E is a polar graph 480 showing a FoV plot for shutter 400 using a 400 nm negative c-plate as compensator element 408. As seen, the FoV where the contrast ratio exceeds 100:1 is much wider than that of the plot in FIG. 2D.

Conventionally, three optical indexes are used to characterize a retarder film, for example $n_x$, $n_y$, and $n_z$. The in-plane retardation $R_0$, encountered by normally incident light, is defined as $(n_x-n_y)d$. The out-of-plane retardation $R_{th}$, relevant when light is incident off-normal, is defined as $[(n_x+n_y)/2-n_z]d$, where d is the thickness of the film. Retardation films have been widely used to offset angular dependent birefringence of LCDs to improve their FoV. For instance, the FoV of a positive uniaxial LC molecule can be compensated by a negative retardation with identical retardation value. Some examples of retardation films being used as LC compensators may be found in Swiss patent application 3819/83 (1983) to H. Amstutz, et al., which is herein incorporated by reference. More recently, a compensation film with z-component was developed to optimize the off-axis leakage for twisted nematic (TN) displays, as may be found in a paper by H. Mori, et al. at Jpn J. Appl. Phys. Vol. 36, p. 143 (1997), which is also herein incorporated by reference.

Figure 5:
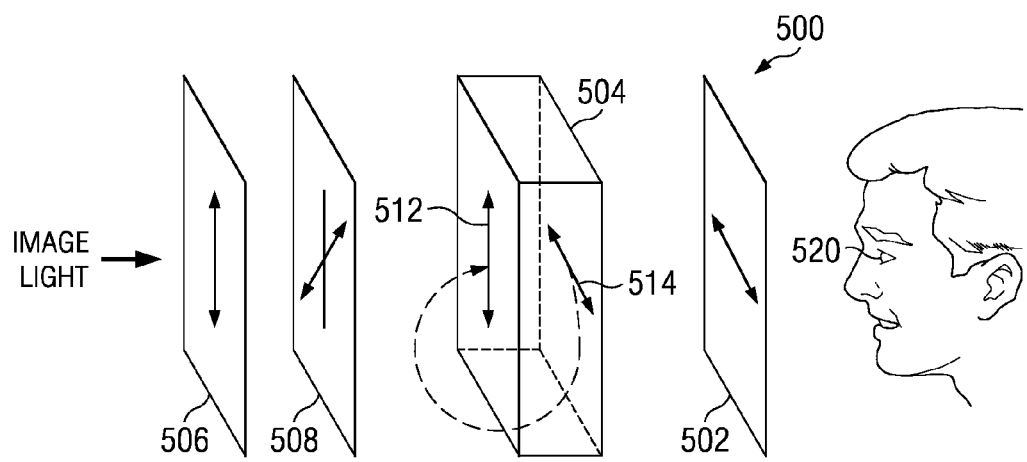
FIG. 5 is a schematic diagram of a STN liquid crystal shutter with a single biaxial plate to provide enhanced contrast performance, in accordance with the present disclosure.

FIG. 5 is a schematic diagram of a STN liquid crystal shutter 500 with a single biaxial plate to provide enhanced contrast performance. Shutter 500 includes first polarizer 502, second polarizer 506, a super-twisted nematic (STN) liquid crystal (LC) cell 504 positioned between the first polarizer 502 and the second polarizer 506, and a biaxial plate 508. The absorption axis of first polarizer 502 is arranged orthogonal to the absorption axis of second polarizer 506. Biaxial plate 508 may be located between second polarizer 406 and STN LC cell 404, with the optical axis of biaxial plate 508 rotated slightly relative to the second polarizer 406. Other compensator elements may be added to the shutter 500 consistent with the disclosed principles.

Figure 6:
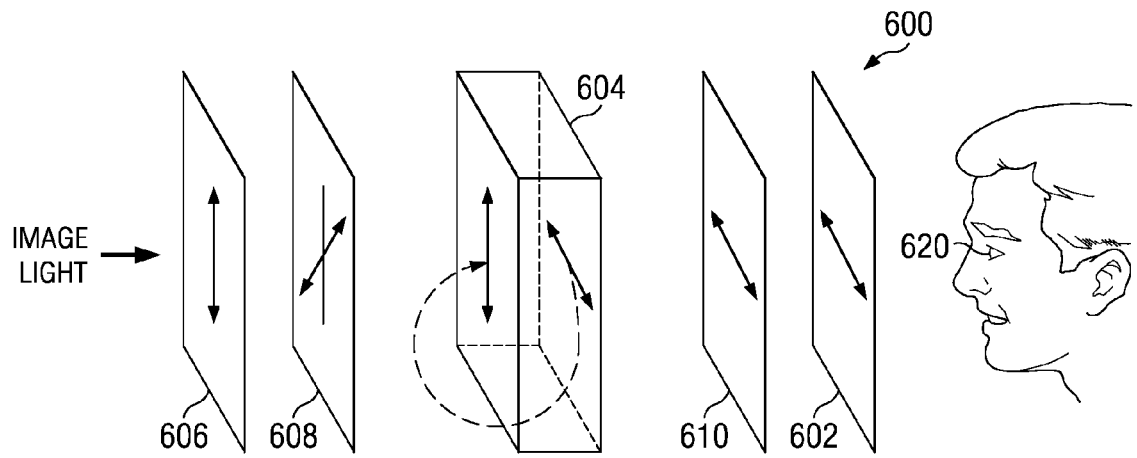
FIG. 6 is a schematic diagram of a STN liquid crystal shutter with biaxial plate compensators either side of the STN LC to provide enhanced contrast performance, in accordance with the present disclosure.

FIG. 6 is a schematic diagram of a STN liquid crystal shutter 600 with a biaxial plates either side of the STN LC to provide enhanced contrast performance. Shutter 600 includes first polarizer 602, second polarizer 606, a super-twisted nematic (STN) liquid crystal (LC) cell 604 positioned between the first polarizer 602 and the second polarizer 606, and a biaxial plate 608. The absorption axis of first polarizer 602 is arranged orthogonal to the absorption axis of second polarizer 606. First biaxial plate 610 is located between first polarizer 602 and STN LC cell 604, and second biaxial plate 608 is located between second polarizer 608 and STN LC cell 604. In this exemplary embodiment, the optical axis of first biaxial plate 610 is aligned with the absorption axis of first polarizer 602, and the optical axis of second biaxial plate 608 is rotated slightly relative to the absorption axis of second polarizer 606. Other compensator elements (not shown) may be added to the shutter 600 consistent with the disclosed principles.

Figure 7:
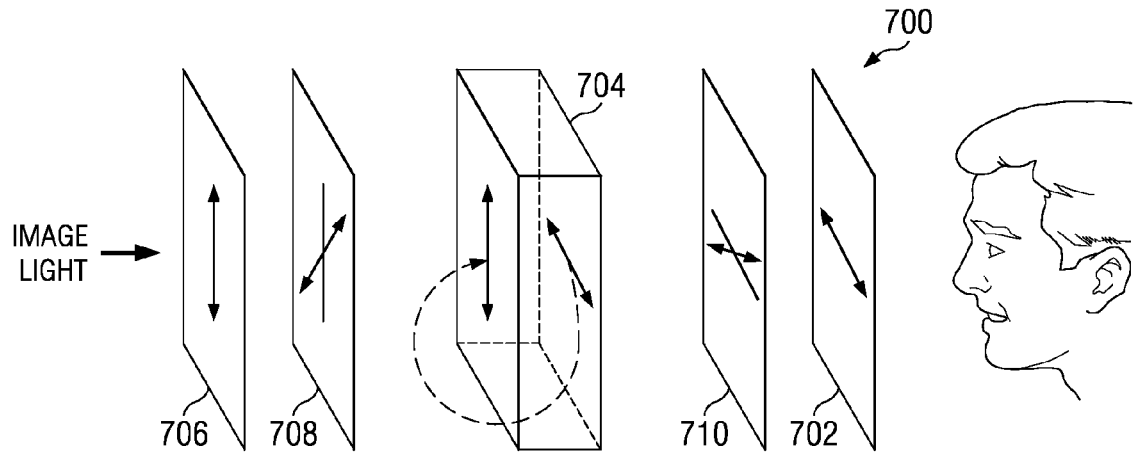
FIG. 7 is a schematic diagram of a STN liquid crystal shutter with biaxial plates either side of the STN LC to provide enhanced contrast performance, in accordance with the present disclosure.

FIG. 7 is a schematic diagram of a STN liquid crystal shutter 700 with biaxial plates either side of the STN LC to provide enhanced contrast performance. Shutter 700 has a similar construction to shutter 600 of FIG. 6, except both biaxial plates are oriented at angles to first and second polarizers 702, 706 respectively. Shutter 700 includes first polarizer 702, second polarizer 706, a super-twisted nematic (STN) liquid crystal (LC) cell 704 positioned between the first polarizer 702 and the second polarizer 706, and a biaxial plate 708. The absorption axis of first polarizer 702 is arranged orthogonal to the absorption axis of second polarizer 706. First biaxial plate 710 is located between first polarizer 702 and STN LC cell 704, and second biaxial plate 708 is located between second polarizer 708 and STN LC cell 704. In this exemplary embodiment, the optical axis of first biaxial plate 710 is rotated slightly relative to the absorption axis of first polarizer 702, and similarly, the optical axis of second biaxial plate 708 is rotated slightly relative to the absorption axis of second polarizer 706. Other compensator elements (not shown) may be added to the shutter 700 consistent with the disclosed principles.

Although the embodiments described with reference to FIGS. 4-7 use STN LCs having a twist angle of 270 degrees, other embodiments may employ a twist angle in the range from just greater than 270 degrees to 285 degrees.

Figure 8:
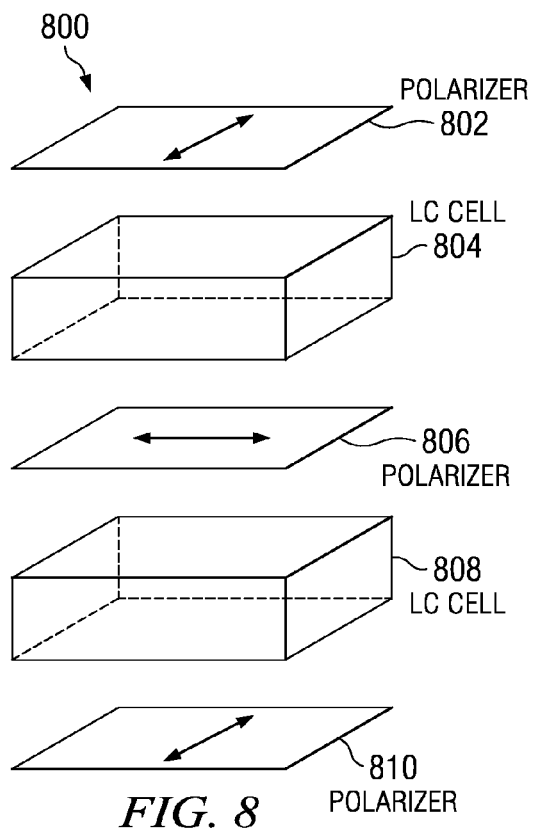
FIG. 8 is a schematic diagram of a dual STN liquid crystal shutter, in accordance with the present disclosure.

FIG. 8 is a schematic diagram of a dual STN liquid crystal shutter 800. In order to further boost the transmission performance without significantly degrading the contrast, two cascade STN LC cells 804, 808 may be used in series. Accordingly, the individual shutter stage 804 can be supplemented with an additional STN LC cell 808. To enhance the overall device transmission, a high contrast polarizer 806 may be used in the middle but high transmissive/low contrast polarizers 802, 810 may be placed in the front and back of the shutter 800. Based on an analysis, the contrast is determined by the middle polarizer 806. For instance, SKN-18244 and SKN-18243 commercial available polarizers from Polatechno have good transmission and good contrast respectively that may be well-suited for this application. Compensator elements may be placed between first polarizer 802 and first STN LC cell 804; and/or between first STN LC cell 804 and middle polarizer 806; and/or between middle polarizer 806 and second STN LC cell 808; and/or between second STN LC cell 808 and third polarizer 810 (not shown). It should be appreciated that various configurations of compensation elements may be used with the dual STN LC cell to provide enhanced contrast performance, consistent with the teachings of the present disclosure.

Figure 9A:
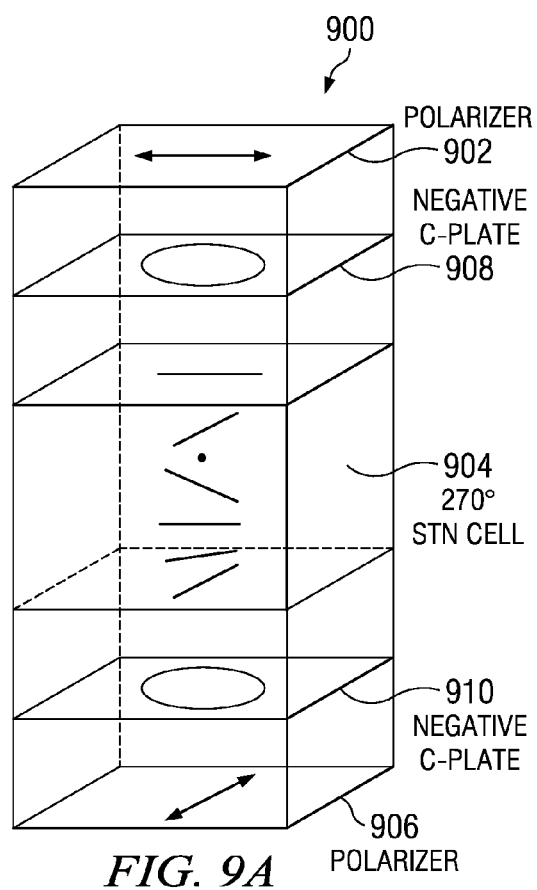
FIG. 9A is a schematic diagram of a two negative c-plate compensated STN display, in accordance with the present disclosure.
Figure 9B:
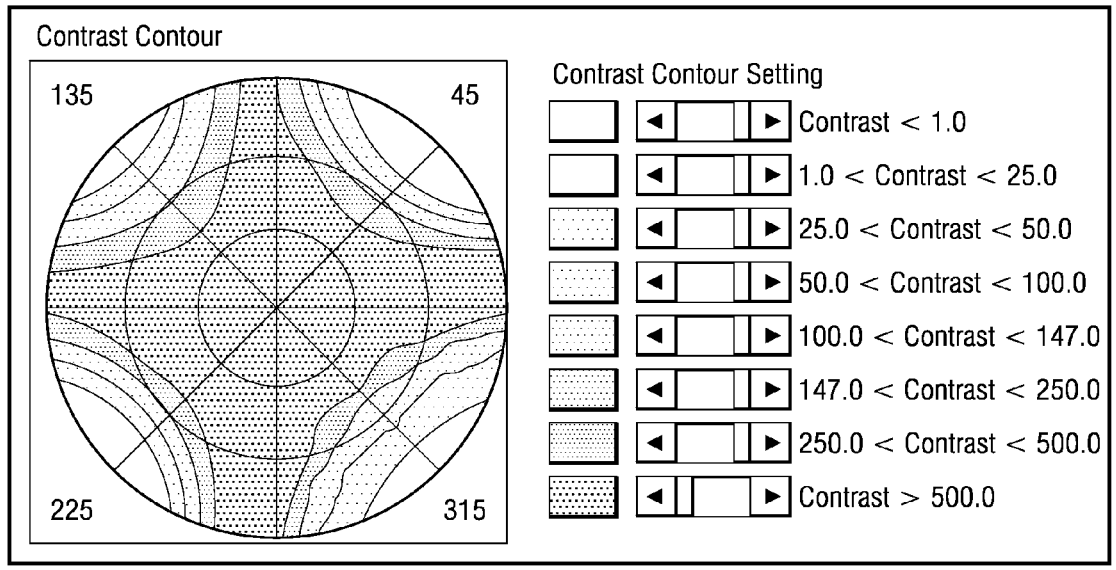
FIG. 9B is a polar plot showing the FoV of o-mode and FIG. 9C is a polar plot showing the FoV or e-mode shutters under the compensation scheme shown in FIG. 9A.
Figure 9C:
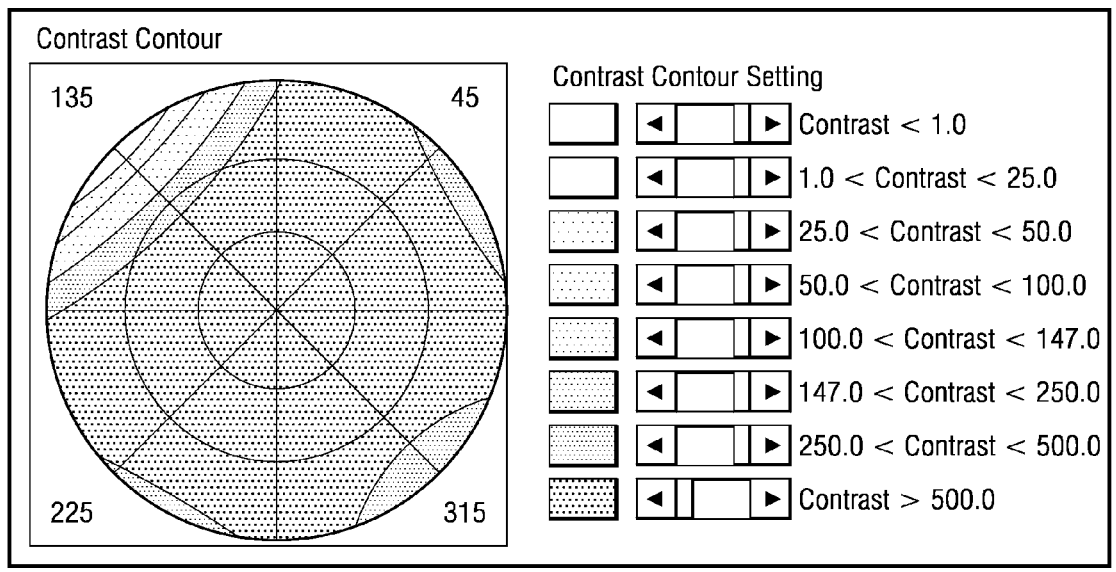

FIG. 9A is a schematic diagram of a two negative c-plate compensated STN shutter 900. STN shutter 900 includes first and second polarizers 902, 906, a 270° STN cell, and first and second negative c-plates 908, 910, arranged as shown. In this exemplary embodiment negative c-plates 908 and 910 may each have retardance of −220 nm. Shutter 900 illustrates an e-mode shutter, but it should be apparent to a person of ordinary skill, that an o-mode embodiment can be made by perpendicularly rotating STN cell 904. When compensation is introduced, significant performance differences may result between e-mode and o-mode cases. In particular, the FoV of the e-mode is far superior to that of the o-mode for STN-based shutters using negative c-plate compensation. FIG. 9B shows the FoV of o-mode and FIG. 9C shows the FoV or e-mode shutters under the compensation scheme shown in FIG. 9A (−220 nm on each side).

Figure 10A:
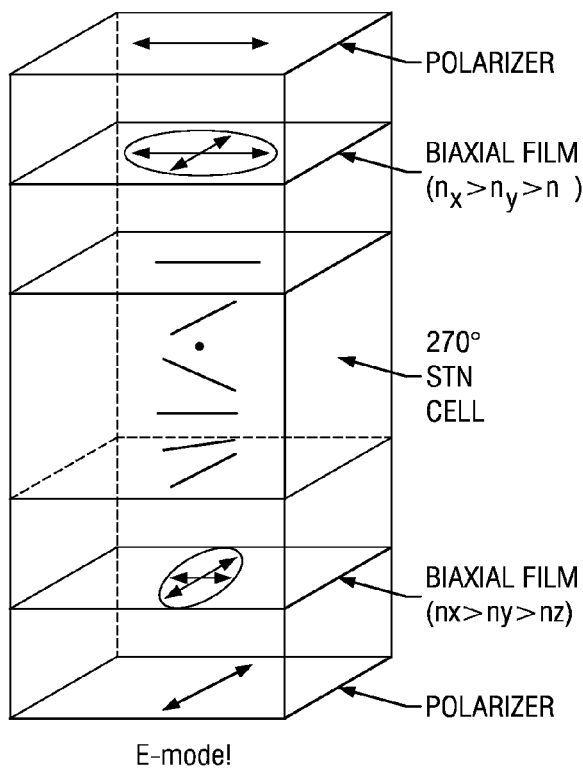
FIGS. 10A and 10B are schematic diagrams showing e-mode and o-mode biaxial compensation schemes for STN LC shutters, in accordance with the present disclosure.
Figure 10B:
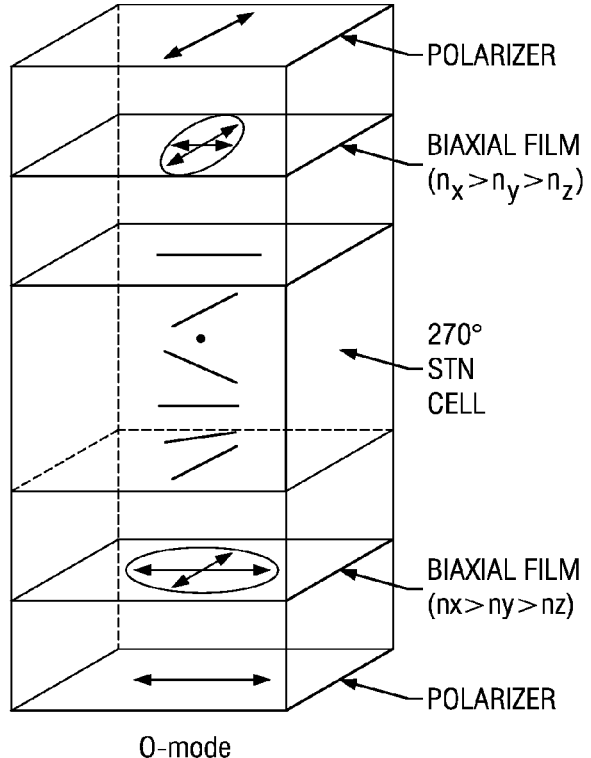

FIGS. 10A and 10B respectively present schematic diagrams of e-mode and o-mode biaxial film compensation schemes for STN LC shutters. Negative c-plates can be made using numerous processes, including biaxial stretching, chemical casting methods, and others. In practice, it is extremely difficult to consistently manufacture a pure negative c-plate with virtually zero in-plane retardation. As a result, these negative retarders may have properties similar to biaxial films. Such retardation can have a negative impact on contrast and FoV when improperly oriented. An important aspect of the present disclosure is the recognition that carefully selected in-plane positive a-plate retardation has the effect of enhancing the FoV further when properly oriented. By introducing a head-on retarder as in FIGS. 10A and 10B, we can further improve the FoV, particularly along 135"/315" view planes.

Figure 11A:
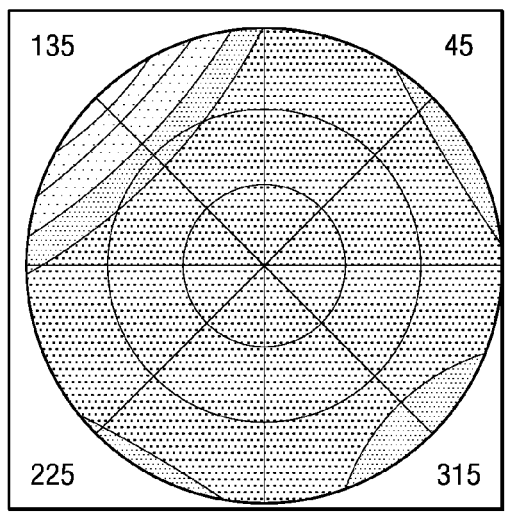
FIG. 11A is a polar graph showing the FoV a 270° STN shutter, having a pure negative c-plate compensator.
Figure 11B:
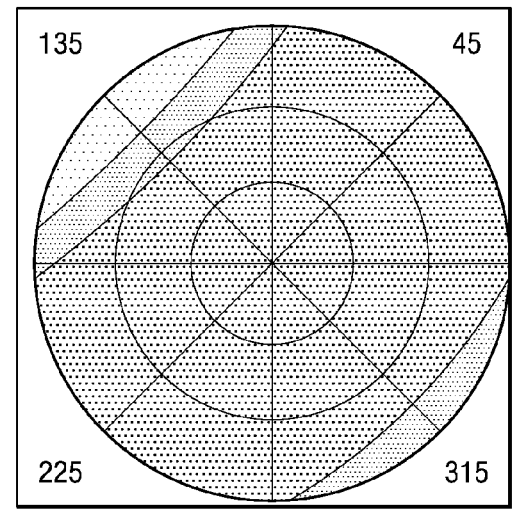
FIG. 11B is a polar graph showing the FoV for a 270° STN shutter, having a compensation film with 10 nm head-on retardation in e-mode.
Figure 11C:
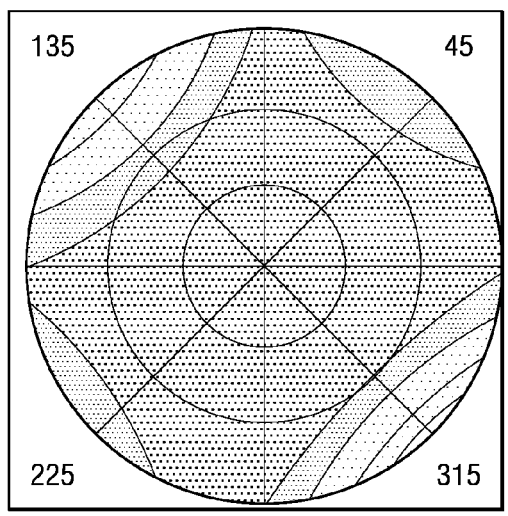
FIG. 11C is a polar graph showing the FoV for a 270° STN shutter, having a compensation film with a 20 nm head-on retardation in e-mode.

FIGS. 11A-11C are polar plots presenting exemplary FoVs under various compensated STN schemes as shown in FIGS. 10A and 10B. FIG. 11A is a polar plot showing the FoV for a pure negative c-plate. FIG. 11B is a polar plot showing the FoV for a 270° STN shutter, having a compensation film with 10 nm head-on retardation in e-mode. FIG. 11C is a polar plot showing the FoV for a 270° STN shutter, having a compensation film with a 20 nm head-on retardation in e-mode.

Figure 12A:
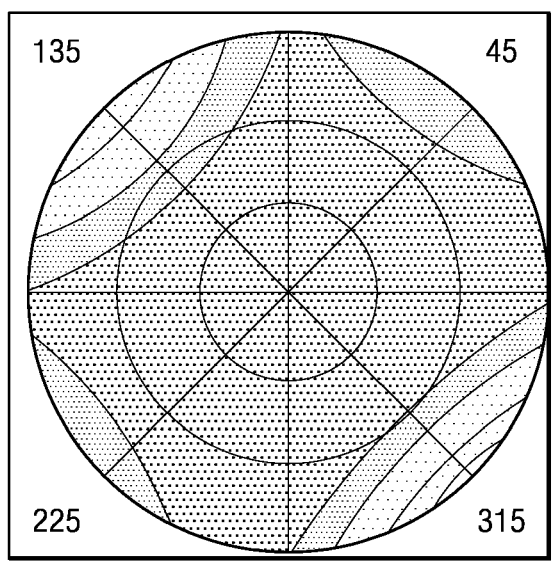
FIGS. 12A and 12B are polar graphs presenting exemplary FoV polar plots for e- and o-mode biaxial compensation schemes.
Figure 12B:
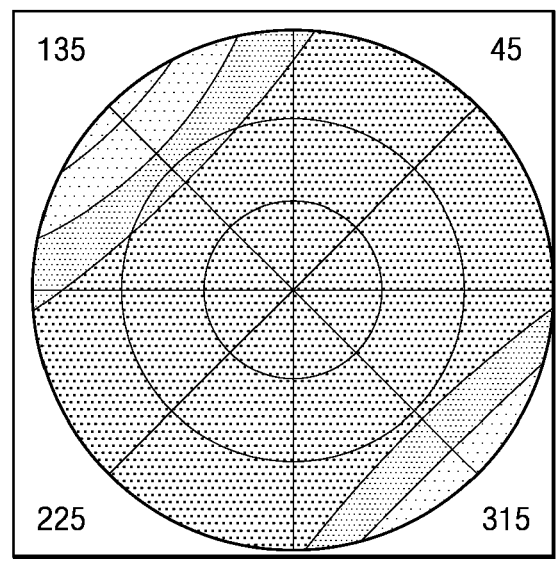

FIGS. 12A and 12B are polar graphs presenting exemplary FoV polar plots for e- and o-mode biaxial compensation schemes. The compensation film for the plot relating to FIG. 12A has 20 nm head-on retardation in e-mode, while the compensation film of FIG. 12B has 20 nm head-on retardation in o-mode. Furthermore, in accordance with the present disclosure, we recognize that the FoV of the optimally compensated o-mode configuration is better than that of the e-mode.

Figure 13A:
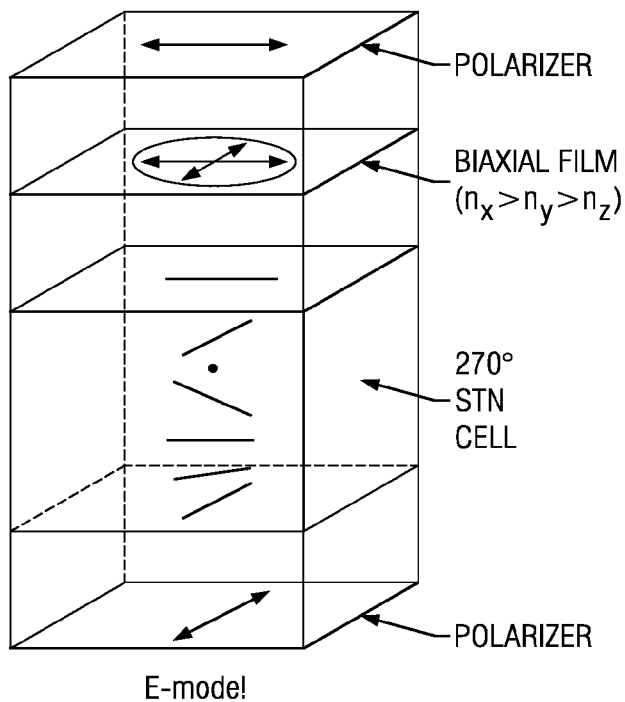
FIGS. 13A and 13B are schematic diagrams illustrating e-mode and o-mode shutters employing single biaxial compensation schemes.
Figure 13B:
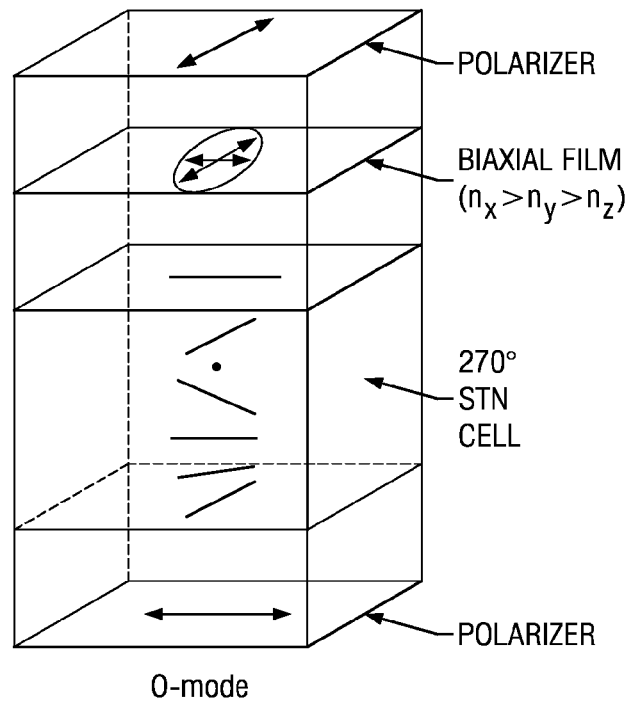

FIGS. 13A and 13B are schematic diagrams illustrating e-mode and o-mode single biaxial compensation schemes. The double biaxial compensation scheme illustrated in FIGS. 10A and 10B can be combined into a single biaxial film scheme for the e-mode and/or o-mode. However, the FoV is much more symmetric in o-mode than in e-mode.

Figure 14:
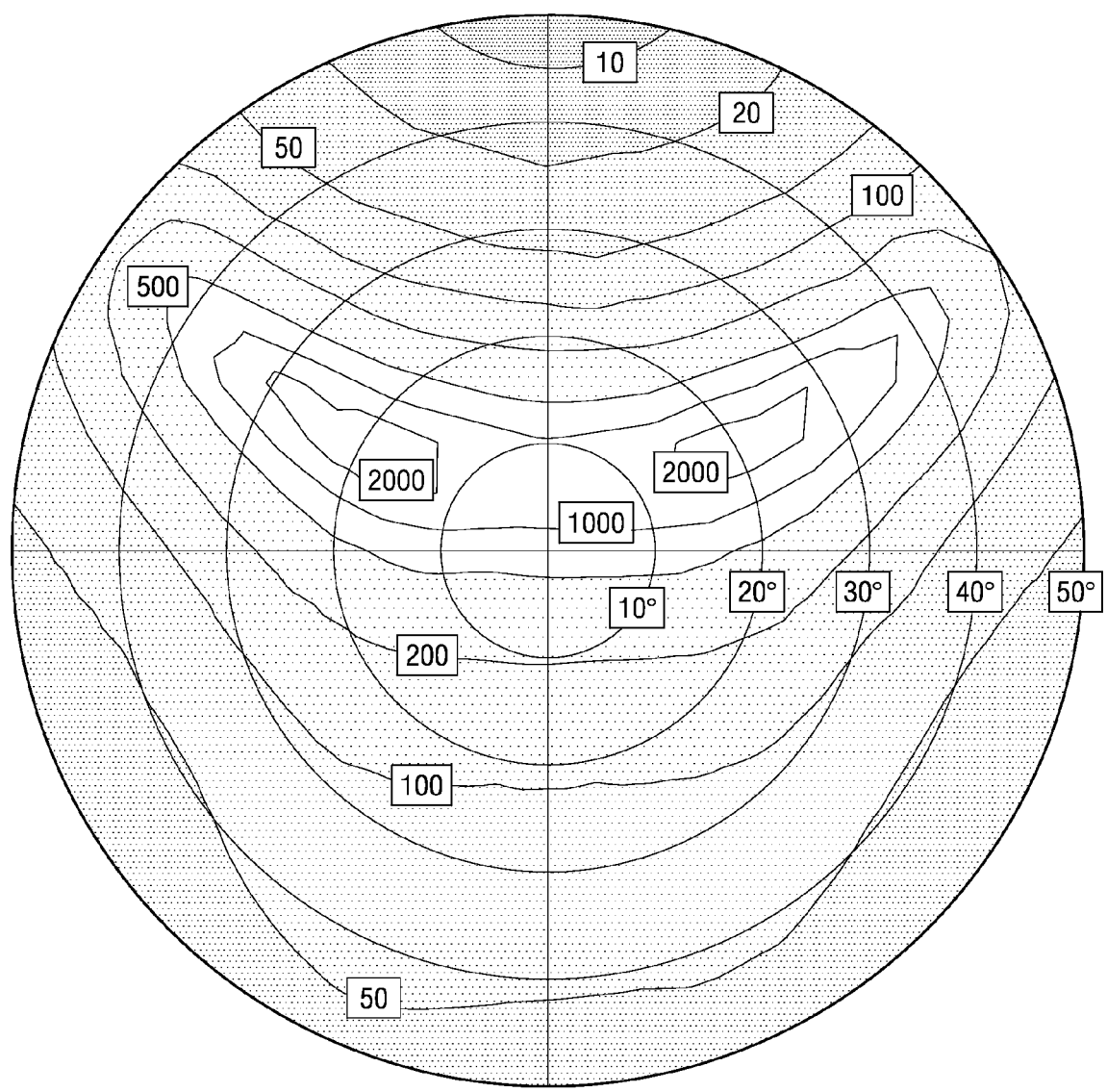
FIG. 14 is a polar graph showing an exemplary contrast polar plot for an o-mode dual-biaxial compensated shutter glass of the present disclosure, according to the design of FIG. 10B.

FIG. 14 is a polar graph showing an exemplary contrast polar plot for a dual-biaxial film shutter glass in o-mode of the present disclosure, according to the design of FIG. 10B. It shows a much lower contrast gradient, such that a minimum of 100:1 contrast is maintained over approximately a 30" cone angle.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A liquid crystal shutter lens, comprising:
    a first polarizer having an absorption axis oriented in a first direction;
    a second polarizer having an absorption axis oriented in a second direction and substantially orthogonal to the first direction;
    a super-twisted nematic (STN) liquid crystal (LC) cell positioned between the first polarizer and the second polarizer, wherein the STN LC cell has a first buffing direction, and wherein the STN LC cell has a second buffing direction substantially 270 degrees from the first direction;
    a first compensator element between the first polarizer and the second polarizer, wherein the first compensator element is a first biaxial compensator, wherein the first biaxial compensator element is between the first polarizer and the STN LC; and
    a second biaxial compensator element between the second polarizer and the STN LC, wherein the second biaxial compensator has a slow axis oriented at an angular range of zero to ten degrees relative to the absorption axis of the second polarizer.

2. The liquid crystal shutter lens of claim 1, wherein the first biaxial compensator has a slow axis oriented at an angular range of zero to ten degrees relative to the absorption axis of the first polarizer.

3. The liquid crystal shutter lens of claim 1, wherein the first biaxial compensator has a slow axis parallel to the absorption axis of the first polarizer.

4. Eyewear for viewing stereoscopic content, comprising:
    a first shutter lens comprising:
        a first polarizer axis having an absorption axis oriented in a first direction;
        a second polarizer having an absorption axis oriented in a second direction and substantially orthogonal to the first direction;
        a first super-twisted nematic (STN) liquid crystal (LC) cell positioned between the first polarizer and the second polarizer, wherein the first STN cell has a first buffing direction, and wherein the first STN LC cell has a second buffing direction substantially 270 degrees from the first direction;
        a first biaxial compensator element between the first polarizer and the first STN LC cell;
        a second biaxial compensator element between the second polarizer and the first STN LC cell;
    a second shutter lens comprising:
        a third polarizer having an absorption axis oriented in a third direction;
        a fourth polarizer having an absorption axis oriented in a fourth direction and substantially orthogonal to the third direction;
        a second super-twisted nematic (STN) liquid crystal (LC) cell positioned between the third polarizer and the fourth polarizer, wherein the second STN LC cell has third buffing direction, and wherein the second STN LC cell has a fourth buffing direction substantially 270 degrees from the third direction;
a third biaxial compensator element between the third polarizer and the second STN LC cell; and
a fourth biaxial compensator element between the fourth polarizer and the second STN LC cell.

5. The eyewear of claim 4, wherein the first buffing direction is oriented in substantially the same direction as the first direction, and wherein the third buffing direction is oriented in substantially the same direction as the third direction.

6. The eyewear of claim 4, wherein the first buffing direction is oriented substantially perpendicular to the first direction, and wherein the third buffing direction is oriented substantially perpendicular to the third direction.

7. The eyewear of claim 4, further comprising a controller communicatively coupled to the first and second shutter lenses.

8. A liquid crystal shutter lens, comprising:
a first polarizer having an absorption axis oriented in a first direction;
a second polarizer having an absorption axis oriented in a second direction and substantially orthogonal to the first direction;
a super-twisted nematic (STN) liquid crystal (LC) cell positioned between the first polarizer and the second polarizer, wherein the STN LC cell has a first buffing direction, and wherein the STN LC cell has second buffing direction greater than 270 degrees from the first direction;
a first compensator element located between the STN LC cell and the first polarizer, the first compensator element having a slow axis oriented in a third direction, wherein the third direction is in a range of zero to ten degrees from the first direction.

9. A liquid crystal shutter lens, comprising:
a first polarizer having an absorption axis oriented in a first direction;
a second polarizer having an absorption axis oriented in a second direction and substantially orthogonal to the first direction;
a third polarizer having an absorption axis oriented substantially parallel to the first direction; and
a super-twisted nematic (STN) liquid crystal (LC) having a twist angle of substantially 275 degrees.

* * * * *